(12) United States Patent
Guan et al.

(10) Patent No.: US 8,750,566 B2
(45) Date of Patent: Jun. 10, 2014

(54) APPARATUS AND METHOD FOR SPATIALLY RELATING VIEWS OF SKY IMAGES ACQUIRED AT SPACED APART LOCATIONS

(75) Inventors: Li Guan, Niskayuna, NY (US); Peter Henry Tu, Niskayuna, NY (US); Yi Yao, Niskayuna, NY (US); Ming-Ching Chang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 286 days.

(21) Appl. No.: 13/403,030

(22) Filed: Feb. 23, 2012

(65) Prior Publication Data

US 2013/0223676 A1   Aug. 29, 2013

(51) Int. Cl.
*G06K 9/00* (2006.01)
*G06K 9/32* (2006.01)

(52) U.S. Cl.
USPC .......................................... 382/103; 382/294

(58) Field of Classification Search
None
See application file for complete search history.

(56) References Cited

U.S. PATENT DOCUMENTS

| | | | |
|---|---|---|---|
| 5,710,875 A * | 1/1998 | Harashima et al. | 345/419 |
| 6,504,951 B1 | 1/2003 | Luo et al. | |
| 6,512,846 B1 | 1/2003 | Luo | |
| 8,446,468 B1 * | 5/2013 | Medioni et al. | 348/144 |
| 2003/0012430 A1 | 1/2003 | Risson | |
| 2004/0085451 A1 * | 5/2004 | Chang | 348/159 |
| 2004/0125207 A1 * | 7/2004 | Mittal et al. | 348/169 |
| 2004/0169770 A1 | 9/2004 | Widener et al. | |
| 2008/0174863 A1 | 7/2008 | Whorton | |
| 2009/0273762 A1 | 11/2009 | Ohira | |
| 2011/0050854 A1 | 3/2011 | Kanamori et al. | |
| 2011/0060475 A1 | 3/2011 | Baldwin et al. | |
| 2011/0091065 A1 | 4/2011 | Chandrashekar et al. | |
| 2011/0220091 A1 | 9/2011 | Kroyzer | |

FOREIGN PATENT DOCUMENTS

| | | |
|---|---|---|
| EP | 2375755 A1 | 10/2011 |
| JP | 60220843 | 11/1985 |
| WO | 2009091237 | 7/2009 |

OTHER PUBLICATIONS

Klaus et. al., "Camera Calibration From a Single Night Sky Image, Computer Vision and Pattern Recognition", 2004. CVPR 2004. Proceedings of the 2004 IEEE Computer Society Conference, IISSN: 1063-6919, pp. I-151-I-157 vol. 1, Issue Date: Jun. 27-Jul. 2, 2004.

(Continued)

*Primary Examiner* — Atiba O Fitzpatrick
*Assistant Examiner* — Carol Wang
(74) *Attorney, Agent, or Firm* — Paul J. DiConza

(57) ABSTRACT

Homography-based imaging apparatus and method are provided. The apparatus may include a processor (44) coupled to process respective sequences of sky images respectively acquired by physical image acquisition devices $18_1$ and $18_2$ at respective spaced apart locations (e.g., $P_1$, $P_2$). The processor may include an image alignment module (32) configured to spatially relate respective views of at least one object (e.g., clouds, aerial vehicles) visible in the respective sequences of the sky images based on homography (42) of at least one astronomical image acquired at each spaced apart location. The astronomical image may include a number of spatial references corresponding to respective astronomical body positions located practically at infinity relative to a respective distance between the spaced apart locations. Further views (synthetic views) may be generated at selectable new locations (e.g., $P_3$, $P_4$, $P_5$, $P_6$), without actually having any physical image acquisition devices at such selectable locations.

30 Claims, 5 Drawing Sheets

(56) References Cited

OTHER PUBLICATIONS

Scaramuzza et al., "A Toolbox for Easily Calibrating Omnidirectional Cameras", inria-00359941, version 1—Feb. 9, 2009, pp. 1-7, 2006, Iros.

Barron et al., "Peformance of Optical Flow Techniques". International Journal of Computer Vision, 12:1, 43-77 (1994), © 1994 Kluwer Academic Publishers, Manufactured in The Netherlands.

Long et al., "Retrieving Cloud Characteristics from Ground-Based Daytime Color All-Sky Images", Journal of Atmospheric and Oceanic Technology, vol. 23, May 2006, pp. 633-652, American Meteorological Society, Richland, WA.

Heinemann et al., "Forecasting of Solar Radiation", Oldenburg University, Institute of Physics, Energy and Semiconductor Research Laboratory, Energy Meteorology Group, pp. 1-10, 2005, Oldenburg, Germany.

Stiller et al., "Estimating Motion in Image Sequences", IEEE Signal Processing Magazine 1053/5888/98, Jul. 1999, pp. 70-91, USA.

Gallup et al., "Variable Baseline/Resolution Stereo", Computer Vision and Pattern Recognition, Jun. 23-28, 2008, pp. 1-8, Anchorage, AK.

Kreuter, "All-sky imaging: a simple, versatile system for atmospheric research", 2009 Optical Society of America, Feb. 20, 2009/ vol. 48, No. 6 / Applied Optics, pp. 1091-1097.

Heinle et al., "Automatic cloud classification of whole sky images, Atmospheric Measurement Techniques", Published by Copernicus Publications on behalf of the European Geosciences Union, May 2010, Atmos. Meas. Tech., 3, pp. 557-567.

Pfister et al., "Cloud Coverage Based on All-Sky Imaging and Its Impact on Surface Solar Irradiance", 2003 American Meteorological Society, Oct. 2003, pp. 1421-1434, Boulder, CO.

Zhengyou Zhang, "On the Epipolar Geometry Between Two Images With Lens Distortion", in Proc. Int'l Conf. Pattern Recognition (ICPR), vol. I, pp. 407-411, Aug. 1996, Vienna.

\* cited by examiner

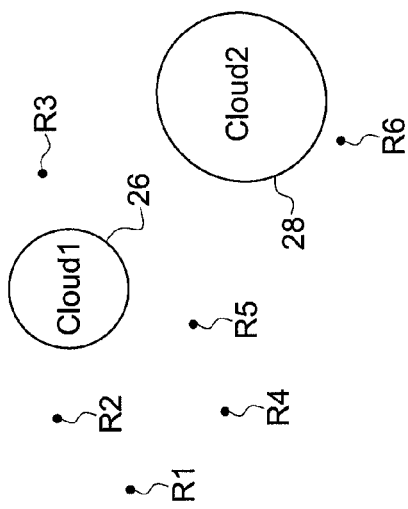
FIG. 3B
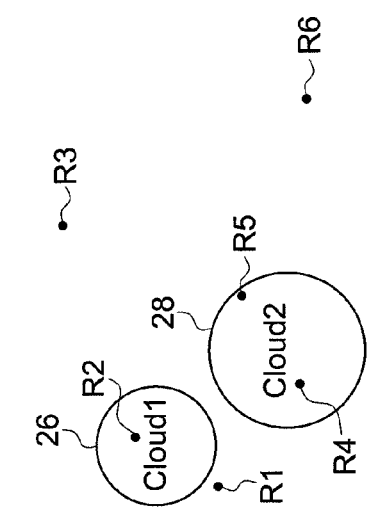
FIG. 3A
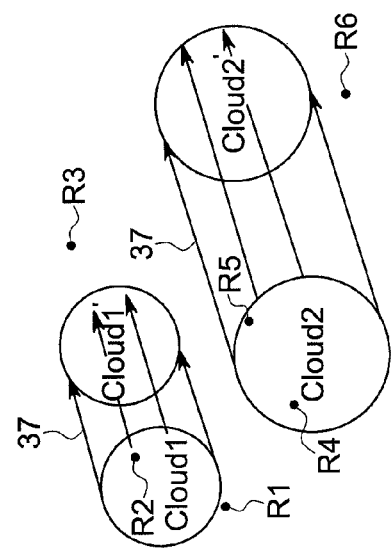
FIG. 4
FIG. 5

APPARATUS AND METHOD FOR SPATIALLY RELATING VIEWS OF SKY IMAGES ACQUIRED AT SPACED APART LOCATIONS

FIELD OF INVENTION

The present invention is generally related to sky imaging, and, more particularly, to a homography-based sky imaging apparatus and method, as may be configured to spatially relate views of sky images acquired at two or more spaced apart locations.

BACKGROUND

Large-scale generation of electric power based on a freely-available, essentially inexhaustible natural resource, such as solar irradiance, continues progressing as an attractive modality for clean and efficient generation of electric power.

The weather-induced variability of the natural resource (e.g., due to cloud coverage variability in the case of solar irradiance) may cause challenges at various levels, such as at a component level, at a subsystem level, at a distribution level as well as on the larger power grid.

A sequence of images (e.g., sky images), as may be acquired by an image acquisition device at a given location of a field, may, for example, be processed to predict motion of a cloud, which may be used to predict occurrence of a solar obscuration event at the given location. Thus, one may effectively predict the occurrence of a solar obscuration event at the given location of the image acquisition device, but not at any arbitrary location on the field, which may involve a relatively large surface area. Accordingly, there is a need for an improved sky imaging apparatus and method.

BRIEF DESCRIPTION

Aspects of the present invention may be fulfilled by an apparatus including a processor coupled to process respective sequences of sky images acquired at respective spaced apart locations. The processor may include an image alignment module configured to spatially relate respective views of at least one object visible in the respective sequences of the sky images based on homography of at least one astronomical image acquired at each spaced apart location. The astronomical image may include a number of spatial references corresponding to respective astronomical body positions located practically at infinity relative to a respective distance between the spaced apart locations.

Further aspects of the present invention may be fulfilled by an apparatus including a processor coupled to process respective sequences of sky images acquired at respective spaced apart locations. The processor may include an image alignment module configured to spatially relate respective views of one or more clouds visible in the respective sequences of the sky images based on homography of at least one astronomical image acquired at each spaced apart location. The astronomical image may include a number of spatial references corresponding to respective astronomical body positions located practically at infinity relative to a respective distance between the spaced apart locations. A parallax determination module may be configured to determine a parallax of the respective views of the one or more clouds based on the spatially related views of the one or more clouds. An event predictor may be configured to predict over a time horizon occurrence of a solar obscuration event. The event predictor may be configured to process at least the determined parallax of the respective views of the one or more clouds and generate a prediction of the solar obscuration event with respect to a synthetic view of the one or more clouds. The synthetic view may correspond to a selectable location different from the spaced apart locations.

Yet further aspects of the present invention may be fulfilled by a homography-based imaging method configured to predict a solar obscuration event. The method may include processing in a processor respective sequences of sky images acquired at respective spaced apart locations. The processing may include spatially relating respective views of one or more clouds visible in the respective sequences of the sky images based on homography of at least one astronomical image acquired at each spaced apart location. At least one astronomical image may contain a number of spatial references corresponding to respective astronomical body positions located practically at infinity relative to a respective distance between the spaced apart locations. The method may further include determining a parallax of the respective views of the one or more clouds based on the spatially related views of the one or more clouds, and predicting over a time horizon occurrence of a solar obscuration event by the one or more clouds. The predicting may involve processing the determined parallax of the respective views of the one or more clouds and generating a prediction of the solar obscuration event with respect to a synthetic view of the one or more clouds. The synthetic view may correspond to a selectable location different from the spaced apart locations.

DRAWINGS

These and other features, aspects, and advantages of the present invention will become better understood when the following detailed description is read with reference to the accompanying drawings in which like characters represent like parts throughout the drawings, wherein.

FIGS. 3A-3B respectively illustrate example sky views from two image acquisition devices located at spaced apart locations.

FIG. 4 illustrates homography-based image alignment of the views respectively shown in FIGS. 3A and 3B.

FIG. 5 illustrates an example of a sky view, which is synthetically-generated in accordance with aspects of the present invention and which may correspond to a selectable location between two or more spaced apart locations.

Figure 6:
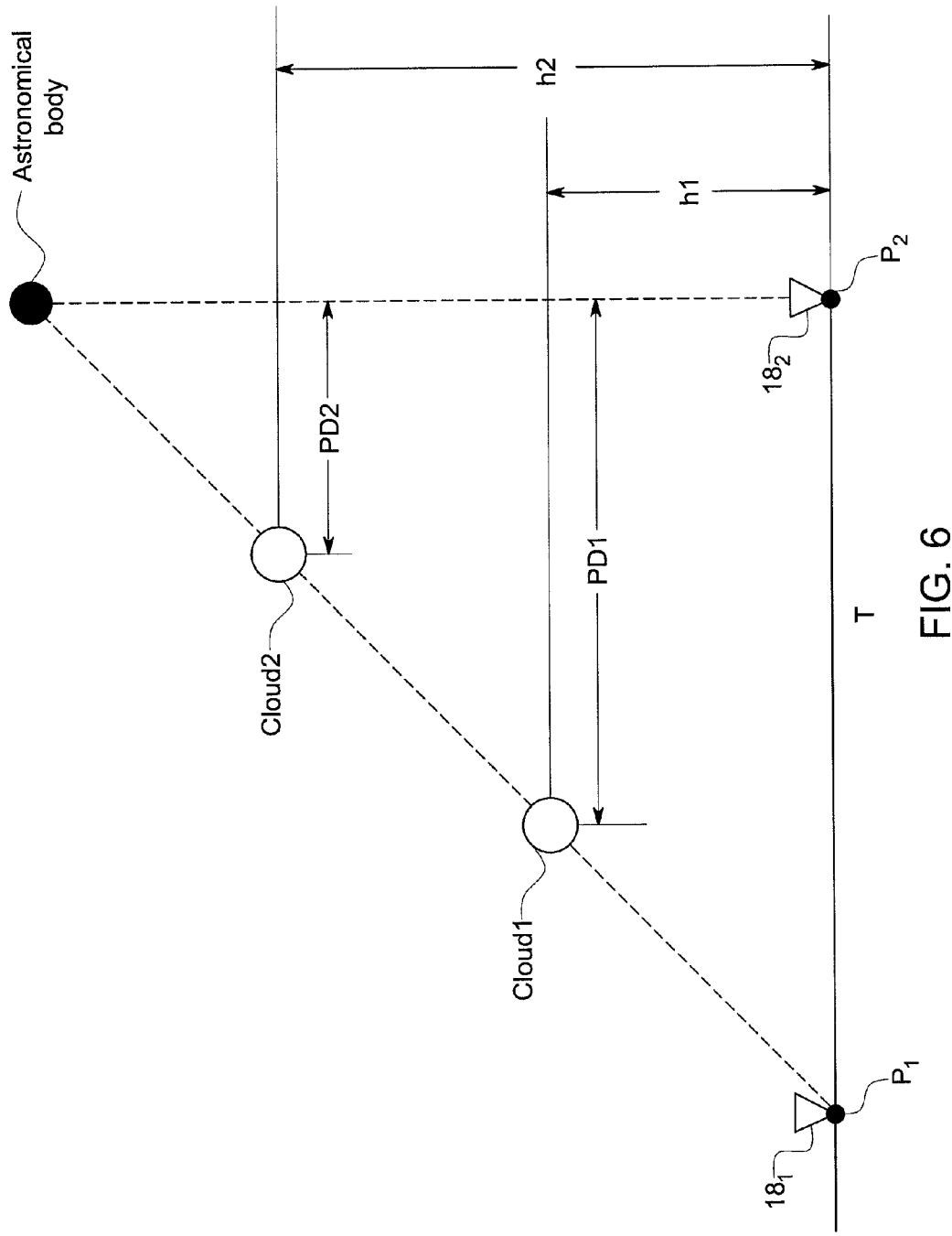

FIG. 6 is a diagram, as may be used for conceptualizing aspects of the present invention, as may involve a determination of a height separation between two example objects (e.g., clouds).

Figure 7:
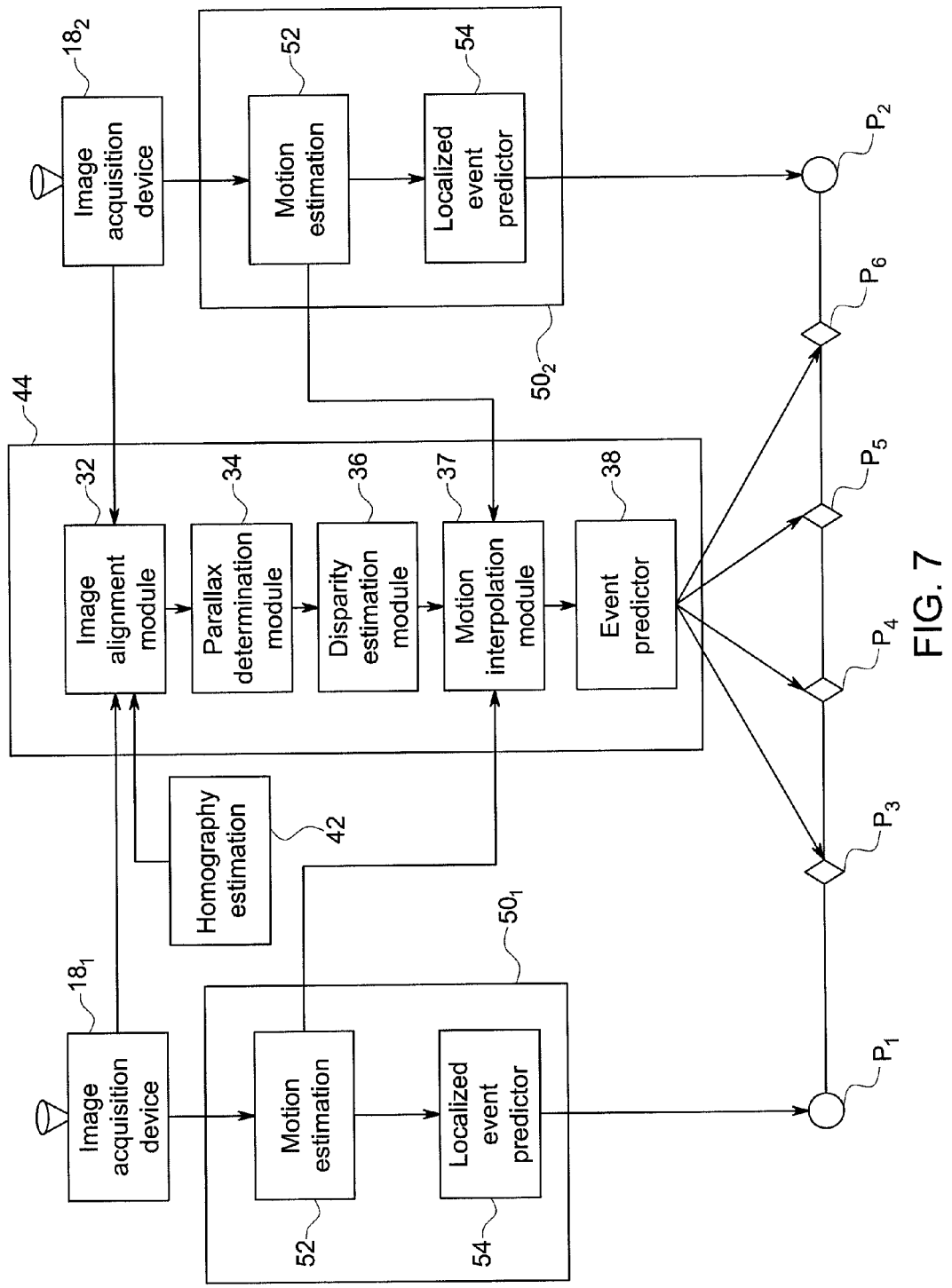

FIG. 7 is a block diagram representation including further details of an example embodiment of an apparatus embodying aspects of the present invention, as may be used for predicting solar irradiance variation due to cloud coverage at selectable locations, without having to use any physical image acquisition device at any such selectable locations.

DETAILED DESCRIPTION

Figure 1:
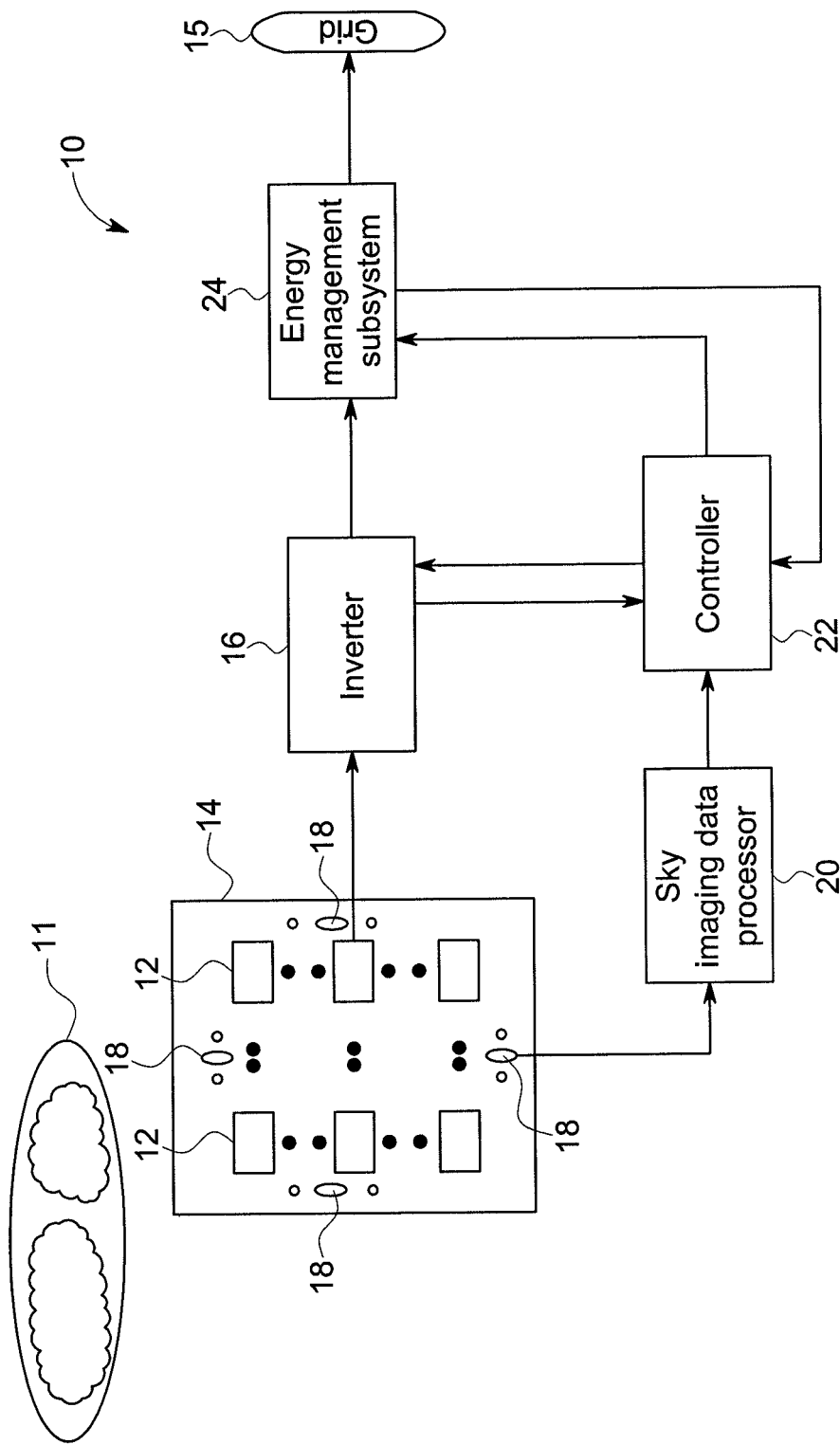
FIG. 1 is a top-level schematic representation of an example embodiment of a power generation system, which may benefit from a sky imaging apparatus embodying aspects of the present invention.

FIG. 1 is a top-level schematic representation of an example embodiment of a power generation system 10, which may benefit from a sky imaging apparatus embodying aspects of the present invention. System 10 may be responsive to solar irradiance for generating electrical power, which may vary in response to weather-varying factors 11, such as cloud coverage, which directly affects solar irradiance. The description below should be construed as an example application of an apparatus embodying aspects of the present invention, as described below in the context of FIGS. 2-7. Accordingly, this example application should not be construed in a limiting sense since other applications may similarly benefit from an apparatus embodying aspects of the present invention. For example, objects which may be monitored by a sky imaging apparatus embodying aspects of the present invention need not be limited to clouds. For example, objects such as aerial vehicles, or any other moving object could be monitored by a sky imaging apparatus embodying aspects of the present invention FIG. 1 illustrates an array of power generators 12, which may be subject to such weather-varying factors. In the example case where power generators 12 may comprise an array of photovoltaic (PV) modules, solar irradiance may for example vary based on varying cloud conditions, which can lead to changes in the power generating conditions of the array of photovoltaic modules. The array of power generators 12 may be disposed over respective locations (e.g., spaced-apart locations) on a field 14, such as a utility-scale solar farm, as may involve a relatively large surface area (e.g., potentially hundreds of acres).

In one example embodiment, one or more inverters 16 may be coupled to the array of power generators 12. For example, as will be appreciated by one skilled in the art, photovoltaic arrays naturally produce direct current (DC) power output when exposed to solar irradiance. Thus, in this example, one or more inverters may be used for converting the DC output from the photovoltaic array to an AC signal appropriate for coupling to a power grid 15.

A plurality of image acquisition devices 18, such as video camera, digital video recorder (DVR), sky imager, etc., may be coupled to a processor 20, such as a sky-imaging data processor, which, as described below, may be configured in accordance with aspects of the present invention to predict over a time horizon a likely occurrence of a solar obscuration event, which can affect a power-generating condition for the array of power generators 12.

A controller 22 may be responsive to processor 20 to adjust a control strategy for at least one component (e.g., inverter 16) and/or subsystem (e.g., energy management subsystem 24) of the power generation system based on the predicted occurrence of the obscuration event. Image acquisition devices 18 may be located at respective spaced-apart locations. In one example embodiment, the spaced-apart locations of image acquisition devices 18 may be spaced-apart at a distance from at least approximately several tens of meters. An upper separation range may be up to several kilometers or more based on the needs of a given application and the overlapping imaging resolution of the image acquisition devices 18.

Figure 2:
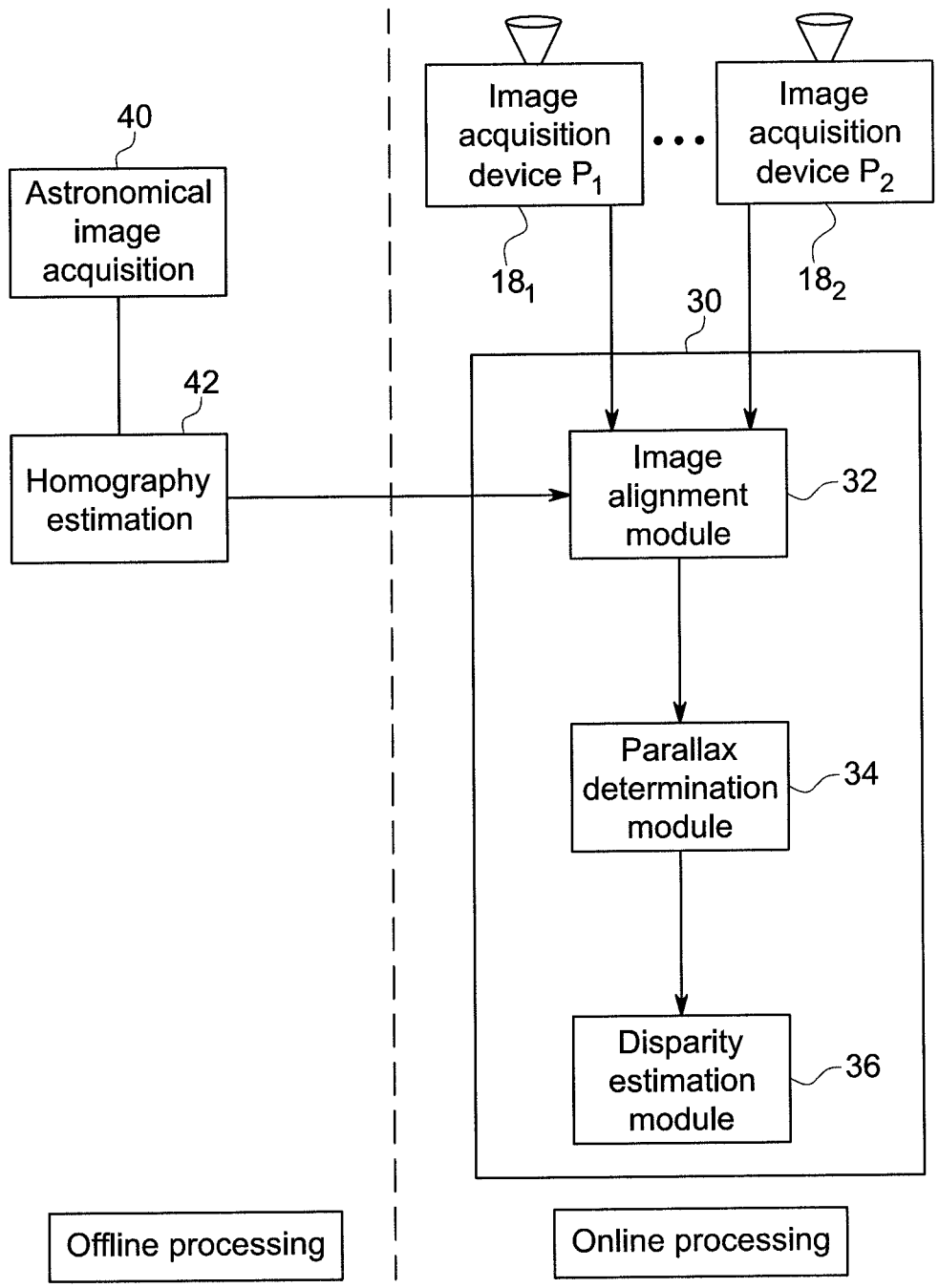
FIG. 2 is a block diagram representation including an example embodiment of an apparatus embodying aspects of the present invention.

For purposes of simplicity of explanation and not of limitation, the description below will be provided in the context of two image acquisition devices located at two different locations. For example, as shown in FIGS. 2, 6 and 7, a first image acquisition device $18_1$ may be located at a first location $P_1$ and a second image acquisition device $18_2$ may be located at a second location $P_2$. In one example embodiment, each image acquisition device may include suitable wide-angle field of view optics (e.g., fish-eye optics). For example, a group of image acquisition devices so equipped may encompass a given field of view of the sky with a relatively smaller number of cameras. Imaging conditioning may be optionally provided to compensate for optical distortion, (e.g., radial distortion) which may be introduced by the wide-angle field of view optics. It will be appreciated that aspects of the present invention are neither limited to any particular kind of image acquisition device nor to the use of wide-angle field of view optics.

In one example embodiment, a processor 30 (FIG. 2) may be coupled to process respective sequences of sky images respectively acquired by image acquisition devices $18_1$, $18_2$ at the respective spaced apart locations $P_1$, $P_2$. In one example embodiment, processor 30 may include an image alignment module 32, which may be configured to spatially relate respective views of at least one object (e.g., clouds, aerial vehicles) visible in the respective sequences of the sky images. This spatial alignment may be based on a homography estimation 42 of at least one astronomical image acquired at each spaced apart location $P_1$, $P_2$, (e.g., astronomical image acquisition 40). It will be appreciated that astronomical image acquisition 40 and homography estimation 42 may be performed a priori (e.g., offline processing) relative to a posteriori processing (e.g., online processing), which may be performed by processor 30. In one example embodiment, image alignment module 32 may be configured to spatially relate the respective views of the one or more objects visible in the respective sequences of images without a calibration of extrinsic parameters (e.g., rotation and translation) of the involved image acquisition devices.

As may be appreciated in the example sky views shown in FIGS. 3A-3B, an astronomical image may include a number of spatial references (e.g., R1-R6) corresponding to respective astronomical body positions (e.g., solar positions diurnally acquired, star positions nocturnally acquired, lunar positions, etc.) located practically at infinity relative to a respective distance between the spaced apart locations $P_1$, $P_2$. By way of example, spatial references (e.g., R1-R6) may represent six star/sun positions with a distance to the Earth ranging from 0.000015 light-years (e.g., the sun) to several light-years.

In one example embodiment, presuming the intrinsic parameters of the image acquisition device are known (e.g., the camera intrinsic parameters have been previously determined), then the number of spatial references in the astronomical image may be at least two non-degenerate spatial references. In another example embodiment, presuming the intrinsic parameters of the one image acquisition device are undetermined (e.g., unknown), then the number of spatial references in the star image may be at least four non-degenerate spatial references.

Processor 30 may further include a parallax determination module 34 configured to determine a parallax of the respective views of the one or more objects (e.g., clouds, aerial vehicles), which may be visible in the respective sequences of the sky images based on the spatially related views of the one or more objects.

As may be appreciated in the example sky views shown in FIGS. 3A-3B, FIG. 3A illustrates a first sky view, which shows two objects 26, 28 (e.g., cloud1 and cloud2), as viewed by image acquisition device $18_1$ at a location $P_1$ and FIG. 3B illustrates a second sky view, which shows same two objects 26, 28 (e.g., cloud1 and cloud2), as viewed by image acquisition device $18_2$ at a location $P_2$. By way of illustration, cloud1 may correspond to a first example cloud having a radius of 200 m at a height of 1500 m, while cloud2 may correspond to a second example cloud having a radius of 150 m at a height of 800 m. It will be appreciated that cloud2 appears to be bigger relative to cloud1 because cloud2 is located closer to the respective image acquisition devices. In one example embodiment, the parallax may be processed to determine a height separation between at least two objects in the respective sequences of images.

FIG. 4 illustrates a spatially related view (e.g., overlaid view) of the respective views of cloud1 and cloud2 shown in FIGS. 3A and 3B (e.g, relative to the perspective of image acquisition device $18_1$ at location $P_1$). One can appreciate that the spatial references R1-R6 exhibit essentially the same relative alignment with respect to cloud1 and cloud2, as shown in FIG. 3A while corresponding cloud projections, e.g., cloud1' and cloud2', exhibit a noticeable displacement (parallax), which is graphically represented by arrows 37, and may indicate a dense correspondence at the pixel level. One may determine, such correspondences (e.g, the parallax) based on optical flow (e.g., flow motion model) after the respective sequences of sky images respectively acquired by image acquisition devices $18_1$, $18_2$ at the respective spaced apart locations $P_1$, $P_2$ are spatially aligned with respect to one another.

Processor 30 may also include a disparity estimation module 36 configured to process the parallax of the respective views of the one or more objects (e.g., cloud1 and cloud2) to generate a synthetic view of the objects corresponding to a selectable location between spaced apart locations $P_1$, $P_2$. That is, the synthetic view is generated without having to use any image acquisition devices at such selectable locations.

For example, FIG. 5 may represent a sky view of cloud1 and cloud2, which is synthetically-generated in accordance with aspects of the present invention, and which may correspond to a given selectable location between the spaced apart locations. In one example embodiment, as may involve sky images respectively acquired by two image acquisition devices $18_1$, $18_2$ at two spaced apart locations, such as $P_1$, $P_2$, disparity estimation module 36 may involve mathematical interpolation to generate the synthetic view between such spaced apart locations $P_1$, $P_2$.

In another example embodiment, as may involve sky images respectively acquired by three image acquisition devices at three spaced apart locations, disparity estimation module 36 may involve mathematical triangulation to generate the synthetic view among such three spaced apart locations. It will be appreciated that in a general case, disparity estimation module 36 may be configured as an n-dimensional linear Euclidean space processor to generate a synthetic view of the one or more objects corresponding to a selectable location among a number of n spaced apart locations. In one example embodiment, n is a positive integer and further n≥2.

FIG. 7 illustrates interplay of an apparatus 44 embodying aspects of the present invention with an apparatus, which may be configured to predict occurrence of a solar obscuration event at the location of the image acquisition device. For example, apparatus $50_1$ may be configured to predict occurrence of a solar obscuration event at location $P_1$ and apparatus $50_2$ may be configured to predict occurrence of a solar obscuration event at location $P_2$. Each apparatus 50 may include a motion estimation module 52 configured to predict motion of one or more objects (e.g., cloud motion) over a time horizon. Each apparatus 50 may further include a localized event predictor 54 configured to predict over the time horizon occurrence of a solar obscuration event at the location where the image acquisition device is located, such as locations $P_1$ and $P_2$. For readers desirous of general background information regarding an example apparatus 50, reference is made to U.S. patent application Ser. No. 13/329,450 filed on Dec. 19, 2011 titled "Apparatus And Method For Predicting Solar Irradiance Variation", which is commonly assigned to the assignee of the present invention, and is herein incorporated by reference.

As illustrated in FIG. 7, an example embodiment of an apparatus 44 embodying aspects of the present invention may include image alignment module 32, parallax determination module 34 and disparity estimation module 36, each as respectively described in the context of FIG. 2, and for the sake of avoiding pedantic and unnecessary repetition, such a description will not be repeated here. Apparatus 44 may further include a motion interpolation module 37 configured to process object motion (e.g., cloud motion) determined by motion estimation modules 52 from the respective sequences of images acquired at locations $P_1$, $P_2$, to predict (e.g., by way of interpolation or any other suitable numerical technique) over the time horizon cloud motion relative to any given selectable location, e.g., example locations $P_3$, $P_4$, $P_5$, $P_6$.

An event predictor module 38 may be configured to predict over the time horizon occurrence of a solar obscuration event. Event predictor module 38 may be configured to, for example, process the determined parallax of the respective views of the one or more clouds in combination, with the event prediction from predictor modules 54 and generate a prediction of the solar obscuration event with respect to a synthetic view of the one or more clouds. The synthetic view may correspond to any selectable location located between image acquisition devices $18_1$ $18_2$, e.g., example locations $P_3$, $P_4$, $P_5$, $P_6$. Essentially, such further views (synthetic views) at any such selectable location may be conceptualized as having virtual additional image acquisition devices at any such selectable locations, without actually having any physical image acquisition devices at such selectable locations.

It will be appreciated that aspects of the present invention are not limited to any specific time horizon since in a practical application the prediction time horizon may involve various tradeoff considerations, such as for example the time horizon should be sufficiently long so that an appropriate control strategy may be timely implemented. Conversely, the time horizon should be sufficiently short so that the degree of uncertainty associated with a prediction event is kept within reasonable bounds. In one example embodiment, such as may involve cloud monitoring, the time horizon may range from approximately several seconds (in the order of approximately five seconds) to approximately several minutes (e.g., in the order of approximately five minutes or more). In another embodiment, such as may involve aerial vehicle monitoring, the temporal resolution may involve sub-second time ranges (e.g., in the order of milliseconds), in lieu of supra-second time ranges.

Recapitulating, it will be appreciated that from a conceptual point of view, aspects of the present invention may include at least three example conceptual aspects: (1) alignment of images collected by image acquisition devices located at spaced-apart locations; (2) estimation of object relative height separation (e.g., cloud height separation), as, for example, may be performed by way of dense parallax computation from optical flow; and (3) generation of further images corresponding to selectable ground locations by interpolating aligned images and a recovered parallax map. It will be appreciated that object motion (e.g., velocity and other information, such as solar irradiance-passing characteristics of the cloud) may also be interpolated from a limited number of spaced-apart image acquisition devices.

Mathematical Underpinnings

Mathematically, an astronomical body (e.g., sun, moon, stars) is located so far away (compared to the distance between image acquisition devices 18 (FIG. 1)) that such astronomical bodies can be mathematically conceptualized as being practically located on respective planes at infinity. Accordingly, one can recover a three-dimensional (3D) planar homography of a plane practically located at infinity for images from spaced-apart image acquisition devices, where such astronomical bodies serve as spatial references for spatially aligning such images.

For the sake of simplicity of explanation and without losing generality, let us describe an example case involving just two image acquisition devices, such as c1 and c2. Let us presume the intrinsic parameters of image acquisition devices c1 and c2 are pre-calibrated and that radial distortion, if any, has been removed. Let K1 and K2 denote example intrinsic parameters of image acquisition devices c1 and c2. One can recover a 3D homography H, so that for any pixel on the plane at infinity from c1 [x y 1] matches to the location in c2 [x' y' 1] with the following expression:

$$s \cdot \begin{bmatrix} x' \\ y' \\ 1 \end{bmatrix} = H \cdot \begin{bmatrix} x \\ y \\ 1 \end{bmatrix}, \qquad \text{Eq. 1}$$

where s is a scalar, and H is a homography that can be expressed in the following general form:

$$H = K2 \cdot \left(R - \frac{tn}{d}\right) \cdot K1^{-1}. \qquad \text{Eq. 2}$$

In Eq. 2, R represents a rotation matrix by which image acquisition device c1 is rotated with respect to image acquisition device c2, t represents a translation vector from image acquisition device c1 to image acquisition device c2, n and d respectively indicate a normal and a distance of the plane at infinity relative to the optical center of image acquisition device c2. Since distance |d| is substantially larger than distance |t| in our case, Eq. 2 can be re-written as:

$$H = K2 \cdot R \cdot K1^{-1} \qquad \text{Eq. 3}$$

As will be appreciated by one skilled in the art, for a classical eight-degree-of-freedom 3×3 homography matrix H, one would normally utilize at least four non-degenerate points (e.g., no three of the four points (e.g., the spatial references discussed in the context of FIGS. 3A and 3B) should be on a same line) on the plane at infinity to calculate the homography matrix H. However, if one presumes that K1 and K2 are pre-calibrated (e.g., determined), then in one example embodiment the computation of homography matrix H may be simplified to computing the 3D rotation matrix R from image acquisition device c1 to image acquisition device c2, which would involve a four-degree-of-freedom computation in lieu of an eight-degree-of-freedom computation. In this example embodiment, one would utilize at least two non-degenerate points (in lieu of at least four non-degenerate points) to recover homography matrix H. It will be appreciated by one skilled in the art that using a relatively higher number of points may provide a more robust estimation of the homography via a least square numerical approximation.

As will be appreciated by one skilled in the art, optical flow may be utilized to monitor a pattern of apparent motion, such as may include objects, surfaces, and edges, in a visual scene caused by the relative motion between an observer (e.g., eye or an image acquisition device) and the scene. The magnitude of the flow may be captured by the following relationship indicative of a relative distance between an object (e.g., cloud) and a given image acquisition device:

$$\frac{h1}{h2} = \frac{T - PD1}{T - PD2}, \qquad \text{Eq. 4}$$

where, as shown in FIG. 6, h1 and h2 represent respective heights of cloud1 and cloud2, PD1 and PD2 represent the respective parallax displacement (or simply the parallax) of cloud1 and cloud2 (e.g., in pixel units), and T represents the separation (e.g., in pixel units) between image acquisition devices $18_1$, $18_2$ at the spaced apart locations $P_1$, $P_2$. Since distance T may be unknown, one may not be able to recover the exact value of the ratio h1/h2. It will be appreciated that a relatively larger parallax displacement would be consistent with a smaller cloud height.

An alternative conceptual explanation may be provided by way of basic geometric relationships, (e.g., proportionality of similar figures) which may readily be appreciated in FIG. 6, and may be characterized as follows:

$$\frac{PD1 - PD2}{T - PD2} = \frac{h2 - h1}{h2}, \qquad \text{Eq. 5}$$

It can be shown that Eq. 5 mathematically corresponds to Eq. 4, which mathematically confirms that a relatively smaller height means a larger parallax and further confirms that if image acquisition devices $18_1$, $18_2$ are at the same location, there is not parallax effect.

To generate a new view (synthetic) view at an arbitrary location between the image acquisition devices $18_1$, $18_2$, at the spaced apart locations $P_1$, $P_2$, one may render pixel values based on a distance ratio between the locations $P_1$, $P_2$, and an optical flow vector magnitude between the two images. Essentially, one can adjust the parameter T in Eq. 4 to obtain a desired parallax along respective axial directions (e.g., x and y directions) of the optical flow. More specifically, to generate a new view between image acquisition device c1 and image acquisition device c2, such as may be at a distance a*T relative to image acquisition device c2, where a is an adjusting variable (e.g., 0<a<1), appropriately selected so that the ratio h1/h2 holds in the above expression. In this example, the parallax of the two clouds in the new view to image acquisition device c2 would be a*PD1 and a*PD2 respectively.

It will be appreciated that in one example embodiment, three image acquisition devices at respective spaced-apart locations will be a minimal number of image acquisition devices which may be used to recover a synthetic view corresponding to the plane on which the three image acquisition devices are located. It will be appreciated that using a relatively higher number of image acquisition devices at respective spaced-apart locations would provide a more robust estimation, such as a least square numerical solution.

To interpolate the cloud velocity at an arbitrary location between the two image acquisition device c1 and c2, analogous to rendering new views, one may interpolate cloud velocity from image acquisition device c1 and from image acquisition device c2, such as based on known cloud velocity measurements at the spaced apart locations $P_1$, $P_2$, (e.g. from per-view optical flow computation obtained from motion estimation modules 52 (FIG. 7). Although aspects of the present invention are not limited to optical flow, it is believed that optical flow may be a suitable tool for cloud tracking since optical flow is capable of handling non-rigid objects, which, for example, may allow accommodating substantial cloud deformation. For example, this may allow computing cloud motion changes for every pixel between two images, which may be used to estimate cloud boundary velocity, such as may involve a plurality of cloud boundary velocity vectors.

It will be appreciated that aspects of the inventive apparatus as may be used for predicting solar irradiance variation and method disclosed herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, imaging acquisition devices), which may include but is not limited to firmware, resident software, microcode, etc. Furthermore, parts of the processor system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. An interface display may be a tablet, flat panel display, PDA, or the like.

In one example embodiment, a processing system suitable for storing and/or executing program code may include in one example at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. Apparatus comprising:
a processor coupled to process respective sequences of sky images acquired at respective spaced apart locations, the processor comprising:
an image alignment module configured to spatially relate respective views of at least one object visible in the respective sequences of the sky images based on homography of at least one astronomical image acquired at each spaced apart location, wherein said at least one astronomical image includes a number of spatial references corresponding to respective astronomical body positions located practically at infinity relative to a respective distance between said spaced apart locations.

2. The apparatus of claim 1, wherein said processor further comprises a parallax determination module configured to determine a parallax of the respective views of said at least one object based on the spatially related views of said at least one object.

3. The apparatus of claim 2, wherein said parallax is configured to determine a height separation between at least two objects in the respective sequences of images.

4. The apparatus of claim 3, wherein a determination of the height separation in the parallax determination module is based on a flow motion model.

5. The apparatus of claim 2, wherein said processor further comprises a disparity estimation module configured to process the parallax of the respective views of said at least one object to generate a synthetic view of said at least one object corresponding to a selectable location different from said spaced apart locations.

6. The apparatus of claim 5, wherein said disparity estimation module comprises an n-dimensional linear Euclidean space processor configured to generate the synthetic view of said at least one object corresponding to a selectable location among a number of n spaced apart locations, wherein n is a positive integer and further wherein n≥2.

7. The apparatus of claim 5, wherein said processor further comprises an object-motion interpolation module configured to process object motion determined from the respective sequences of images to predict over a time horizon object motion relative to the selectable location.

8. The apparatus of claim 1, wherein the respective sequences of sky images is each respectively acquired by at least one image acquisition device located at each respective spaced apart location.

9. The apparatus of claim 8, wherein intrinsic parameters of said at least one image acquisition device are determined and the number of spatial references in said at least one astronomical image comprises at least two non-degenerate spatial references.

10. The apparatus of claim 8, wherein intrinsic parameters of said at least one image acquisition device are undetermined and the number of spatial references in said at least one astronomical image comprises at least four non-degenerate spatial references.

11. The apparatus of claim 8, wherein the image alignment module is configured to spatially relate the respective views of said at least one object visible in the respective sequences of images without a calibration of extrinsic parameters of said at least one image acquisition device.

12. The apparatus of claim 6, wherein said at least one image acquisition device comprises a wide-angle field of view optics.

13. The apparatus of claim 12, wherein said processor further comprises an image conditioning module configured to compensate for optical distortion introduced by the wide-angle field of view optics.

14. The apparatus of claim 1, wherein the respective distance between said spaced apart locations is at least approximately several tens of meters.

15. The apparatus of claim 7, wherein said at least one object comprises a cloud and further wherein the time horizon comprises a range from approximately several seconds to approximately several minutes.

16. The apparatus of claim 7, wherein said at least one object comprises an aerial vehicle and a temporal resolution regarding a motion prediction for said aerial vehicle comprises a sub-second time range.

17. The apparatus of claim 5, wherein the respective sequences of sky images is each respectively acquired by at least three image acquisition devices located at respective spaced apart locations, wherein a generated synthetic view corresponds to the plane on which the three image acquisition devices are located.

18. Apparatus comprising:
a processor coupled to process respective sequences of sky images acquired at respective spaced apart locations, the processor comprising:
an image alignment module configured to spatially relate respective views of at least one cloud visible in the respective sequences of the sky images based on homography of at least one astronomical image acquired at each spaced apart location, wherein said at least one astronomical image includes a number of spatial references corresponding to respective astronomical body positions located practically at infinity relative to a respective distance between said spaced apart locations; and
a parallax determination module configured to determine a parallax of the respective views of said at least one cloud based on the spatially related views of said at least one cloud;
an event predictor configured to predict over a time horizon occurrence of a solar obscuration event, the event predictor configured to process at least the determined parallax of the respective views of said at least one cloud and generate a prediction of the solar obscuration event with respect to a synthetic view of said at least one cloud, wherein said synthetic view corresponds to a selectable location different from said spaced apart locations.

19. The apparatus of claim 18, wherein said parallax is configured to determine a height separation between at least two clouds in the respective sequences of images.

20. The apparatus of claim 19, wherein a determination of the height separation in the parallax determination module is based on a flow motion model.

21. The apparatus of claim 18, wherein said processor further comprises a disparity estimation module configured to process the parallax of the respective views of said at least one cloud to generate the synthetic view of said at least one cloud corresponding to the selectable location.

22. The apparatus of claim 21, wherein said disparity estimation module comprises an n-dimensional linear Euclidean space processor configured to generate the synthetic view of said at least one cloud corresponding to a selectable location among a number of n spaced apart locations, wherein n is a positive integer and further wherein n≥2.

23. The apparatus of claim 18, wherein said processor further comprises a cloud-motion interpolation module configured to process cloud motion determined from the respective sequences of images to predict over the time horizon cloud motion relative to the selectable location.

24. The apparatus of claim 18, wherein the respective sequences of sky images is each respectively acquired by at least one image acquisition device located at each respective spaced apart location.

25. The apparatus of claim 18, wherein intrinsic parameters of said at least one image acquisition device are determined and the number of spatial references in said at least one astronomical image comprises at least two non-degenerate spatial references.

26. The apparatus of claim 18, wherein intrinsic parameters of said at least one image acquisition device are undetermined and the number of spatial references in said at least one astronomical image comprises at least four non-degenerate spatial references.

27. The apparatus of claim 24, wherein the image alignment module is configured to spatially relate the respective views of said at least one cloud visible in the respective sequences of images without a calibration of extrinsic parameters of said at least one image acquisition device.

28. The apparatus of claim 24, wherein said at least one image acquisition device comprises a wide-angle field of view optics.

29. The apparatus of claim 28, wherein said processor further comprises an image conditioning module configured to compensate for optical distortion introduced by the wide-angle field of view optics.

30. A homography-based imaging method configured to predict a solar obscuration event comprising:
processing in a processor respective sequences of sky images acquired at respective spaced apart locations, the processing comprising:
spatially relating respective views of at least one cloud visible in the respective sequences of the sky images based on homography of at least one astronomical image acquired at each spaced apart location;
providing in said at least one astronomical image a number of spatial references corresponding to respective astronomical body positions located practically at infinity relative to a respective distance between said spaced apart locations;
determining a parallax of the respective views of said at least one cloud based on the spatially related views of said at least one cloud; and
predicting over a time horizon occurrence of a solar obscuration event by said at least one cloud, wherein the predicting comprises processing the determined parallax of the respective views of said at least one cloud and generating a prediction of the solar obscuration event with respect to a synthetic view of said at least one cloud, wherein said synthetic view corresponds to a selectable location different from said spaced apart locations.

* * * * *